United States Patent

Attal

[19]

[11] Patent Number: 5,860,010
[45] Date of Patent: Jan. 12, 1999

[54] USE OF LANGUAGE WITH SIMILAR REPRESENTATION FOR PROGRAMS AND DATA IN DISTRIBUTED DATA PROCESSING

[75] Inventor: Denis Attal, Chatillon, France

[73] Assignee: Bull S.A., Puteaux, France

[21] Appl. No.: 905,389

[22] Filed: Aug. 4, 1997

Related U.S. Application Data

[63] Continuation of Ser. No. 295,783, filed as PCT/FR93/00251 Mar. 12, 1993 published as WO93/18453 Sep. 16, 1993, abandoned.

[30] Foreign Application Priority Data

Mar. 12, 1992 [FR] France .................................. 92 02977

[51] Int. Cl.$^6$ ....................................................... G06F 9/45
[52] U.S. Cl. ............................................................ 395/706
[58] Field of Search .................................... 305/705, 706

[56] References Cited

U.S. PATENT DOCUMENTS

| | | | |
|---|---|---|---|
| 4,989,132 | 1/1991 | Mellender et al. ...................... | 395/700 |
| 5,257,369 | 10/1993 | Skeen et al. ............................. | 395/650 |
| 5,283,900 | 2/1994 | Frankel et al. .......................... | 395/700 |
| 5,446,902 | 8/1995 | Islam ....................................... | 395/700 |
| 5,465,377 | 11/1995 | Blaner et al. ............................ | 395/800 |
| 5,471,622 | 11/1995 | Eadline ................................... | 395/650 |

OTHER PUBLICATIONS

Silberschatz et al., "Operating System Concepts, Fourth Edition", Addison–Wesley Publishing, 1994, sections 15.7 & 15.7, pp. 498–504, 1994.

NTT Review, vol. 4, No. 1, Jan. 1992. Tokyo, JP, pp. 85–90 Y. Amagai, "A Distributed LISP Programming Workbench" & INSPEC Database, Inst. of Elect. Eng., Accession 4130896.

Proceedings of the Nineteenth Annual Southeastern Symposium on System Theory, 1987, Wash., DC, pp. 126–130, Padalkar et al., "Communicating Sequential LISP Systems for VMX/DEC–NET" & INSPEC Database, Inst. of Elect. Eng, Acces.2988587.

Communications of the ACM, vol. 34, No. 9, Sep. 1991, NY, pp. 59–61, H. Muller, "LispView: Leverage Through Integration:".

Informatik Spektrum, vol. 14, No. 1, Feb. 1991, Berlin, DE, pp. 34–36, M. Muth, "Das X–Window System".

I.E.E.E. Transactions on Computers, vol. 37, No. 8, Aug. 1988, NY, NY, US, pp. 930–944, R. Bisiani et al., "Multi-language Parallel Programming of Heterogeneous Machines".

*Primary Examiner*—Emanuel Todd Voeltz
*Assistant Examiner*—Peter J. Corcoran, III
*Attorney, Agent, or Firm*—Kerkam, Stowell, Kondracki & Clark, P.C.; Edward J. Kondracki

[57] ABSTRACT

A language with similar representation for programs and data is used in cooperative data processing applications, particularly for the distribution of information and processing in a network management system in accordance with executable messages which convey the code to be executed, identifying simultaneously the functions to be applied and the data on which the functions must be applied. The messages are asynchronous and are sent in the network in a free format from an interpreter INT of said language in one machine to another interpreter of said language in another machine.

22 Claims, 1 Drawing Sheet

USE OF LANGUAGE WITH SIMILAR REPRESENTATION FOR PROGRAMS AND DATA IN DISTRIBUTED DATA PROCESSING

This is a continuation of application Ser. No. 08/295,783, filed as PCT/FR93/00251 Mar. 12, 1993 published as WO93/18453 Sep. 16, 1993, now abandoned.

FIELD OF THE INVENTION

The present invention relates to the use of a language with similar representation for programs and data.

BACKGROUND OF THE INVENTION

Traditionally, this type of language is essentially used in the field of artificial intelligence. In comparison with conventional languages, this type of language fulfills the functional objective of being manipulable without restriction, and of having effective recursive programming as well as automatic management of program-data memory. Moreover, due to the similar representation of the programs and the data, a program can self-modify in order to take new events into account. However, outside its application in the field of artificial intelligence, its use is not highly regarded, and in particular there are many preconceived notions with respect to its use in other fields, especially the new field of distributed data processing.

In this field, in response to this concern, special mechanisms called "RPCs" (Remote Procedure Calls) have been conceived in order to allow locally executed programs to call procedures installed in remote systems. These mechanisms authorize the distribution of access to applications services. This RPC mechanism allows a conventional language like C to call a procedure executed in a remote machine using a different addressable space in the same machine. RPC calls allow the distribution of access to applications services and offer programmers tools for constructing server-client applications in a simplified way.

However, this RPC type of mechanism has its limits and even presents some serious drawbacks. Thus, during an RPC call in a server-client application, the server programs define the functions that can be called with a list or a description of parameters, and these parameters are transmitted remotely from the client to the server, an operation which is extremely static, offers little flexibility and does not permit for example transmission of an executable structure such as a code fragment. Thus, it is not possible to completely send the contents of a transaction to a transactional server and then retrieve the results from it. Moreover, the communication between applications that are running on different machines is synchronous, which poses problems with down time until the responses are returned. In effect, the RPC mechanism, in order to unify local data processing with distributed data processing, proposes generalizing the notion of a function call to the network, which means that the parameters of the called function are transmitted, and since this mechanism functions in a synchronous manner, there is ensuing down time until the function returns a value and only after that does the execution proceed. Moreover, problems of coherence with other protocols are encountered, particularly with X/WINDOWS (trade mark registered by M.I.T.). When, for example, exchanges with the terminals are based on protocols with messages, meaning the asynchronous type, it may be difficult to obtain unification with RPC-type mechanisms executing the function calls which themselves are by definition synchronous. In general, the choice of synchronous-type mechanisms for applications in the telecommunications field is at odds with certain concepts of asynchronism, messages, and types of protocols, and also with notions of acknowledgment and anticipation, all of which are acquired concepts belonging to the culture of this telecommunications field.

The object of the present invention is to remedy these various drawbacks and to propose the use of a language with similar representation for programs and data which is simple and which facilitates the applications to distributed data processing.

For this purpose, the type of language mentioned above is used for the distribution of information and processing in a network management system in accordance with executable messages which convey the code to be executed, meaning simultaneously the functions to be applied and the data to which these functions must be applied, which are asynchronous messages sent through the network in a free format from an interpreter of this language in one machine to another interpreter of this language in another machine, and which moreover authorize a dynamic modification of the code as a function of the data manipulated during the execution and a dynamic migration of different code fragments to the different machines of the management system.

SUMMARY OF THE INVENTION

Thus, contrary to all expectations, the idea of the invention consists of using a symbolic programming language conceived essentially to be applied in the artificial intelligence field in the field of distributed data processing. A message in the symbolic language is sent from an interpreter running on one machine to another interpreter in another machine, but since this message is an executable or a fragment of an executable, it contains not only data, but also contains the function or functions to be applied to these data, which is different from the RPC mechanism in which the function is local to the server and in which only the data are sent remotely within the framework of a defined protocol between client and server. The function and the data form an executable message sent across the network which provides great flexibility, something that is absolutely unusual in matters of distribution to the extent that the request has a free format, meaning that it is not defined by a protocol or by functions set by the server. In this way, a local machine which has a program can send program fragments for execution in different machines.

Another advantage is attached to the choice of a language with similar representation for programs and data which by definition can self-modify in order to take new facts into account, thus facilitating learning and furnishing an intelligent system that is capable of dynamically modifying code during an execution. According to the present invention, the sending of an executable message, which may be a code fragment that has a meaning of its own, may correspond to a simple function call or conversely, in a complex way, to a program modification, which further improves the flexibility in a distributed data programming application. Thus, it is easy to transmit the contents of a transaction to a transactional server and to retrieve the results.

Moreover, the asynchronous exchange of messages eliminates any risk of down time for an application in the system while it runs on different machines. For example, the application continues to function during the wait for a request or for a response to a request, and as soon as the request or the response to a request arrives, an action is initiated. Likewise, the asynchronism of the exchange also makes it possible to eliminate any problem of coherence with other protocols.

Finally, the present invention makes it possible to benefit from a property that is also very advantageous, which is that of facilitating a dynamic balancing of loads between the different processors or machines (machines in a network, multiprocessors with or without shared memory, clusters, etc.), each of which has a language interpreter according to the invention. Dynamically, one code fragment corresponding to a set of complex operations may proceed to migrate to any one of the machines in the system, another code fragment may proceed to migrate to a second machine, and so on, while the set is managed in such a way that the load is distributed, which means that these code fragments may be called in such a way that the use of the central processing unit (CPU) is distributed among the different machines. This property also has the advantageous effect of authorizing wide availability of the system, which permits a redistribution or a different regrouping of the machines in case one of them is down. Such a property, which is obtained simply through the formalism of the language used according to the invention, would require a high degree of complexity with a conventional language, for example the C type, in which each machine in the system would have to possess the entire code in order to be able to carry out the set of tasks to be executed.

According to a preferred application of the present invention, the language used is a LISP-type language.

Remarkably, the interpreter of the language in each machine is principally constituted by a nucleus which processes the program to be executed by relying as much on the internal services (evaluator, memory management) as on the code which executes the primitive functions of the language, and by a documented programmatic interface between the nucleus and the code which executes the primitive functions for authorizing access to a plurality of services and facilitating the extension of the language and the interpreter to new primitive functions.

This interpreter permits easy, rapid, and effective development of a desired application. Due to the language used, the various functions can be coded (in an environment constituted by the interpreter and various libraries to which the interpreter has access) and rapidly tested without passing through the traditional phases of compilation-linkage-execution that are necessary with other programming languages. Thus, the code is never compiled, and when the interpreter is called, any existing code is loaded and immediately interpreted. The programmatic interface offers access to a plurality of services; it must be clear and well-documented in order to advantageously facilitate the extension of the language and of the interpreter itself to new primitive functions offering, for example access to new servers.

BRIEF DESCRIPTION OF THE DRAWINGS

The following description with regard to the appended drawing, given by way of a non-limiting example, will make it clearly understood how the invention may be put into effect.

The single figure offers an example of a structure which represents an interpreter and a set of libraries to which it has access.

DETAILED DESCRIPTION OF THE PREFERRED EMBODIMENTS

Figure 1:
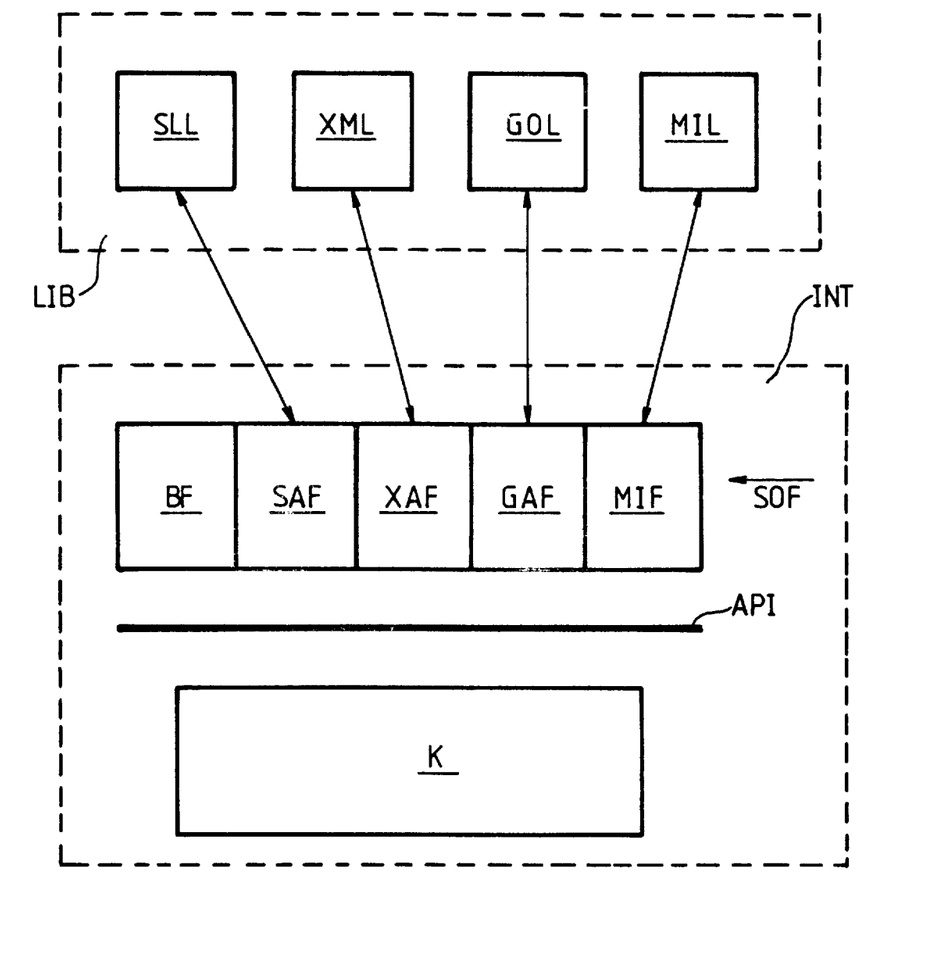

In the single figure, the interpreter is labelled INT and the set of libraries is labelled LIB. The language interpreter INT is principally composed of a nucleus K, a programmatic interface API and a set of functions SOF which implement the primitive functions of the interpreter INT. In this set of functions, two categories may be roughly distinguished. The base functions BF, meaning the functions belonging to the language with similar representation for programs and data, advantageously for example the base functions of LISP, belong in the first category. The extended functions which assure the interface with various services represented by the label LIB, belong to the second one. Thus, in the example shown in the single figure, a set of functions SAF allows access to a library that is specific to a structured language SLL, which in turn serves as an interface with the relational data bases (not represented). Another set of functions XAF allows access to a library XML whose purpose is to furnish the components for developing and managing graphic user interfaces. A third set of functions GAF allows access to a library GOL which authorizes the applications that use elaborate graphic objects. A fourth set of functions MIF allows access to a library MIL, which in turn serves as an interface with the management services of networks and information systems.

In the first or second category of sets of functions, the usage of a primitive function of the language used according to the invention (which in the name of simplification is hereinafter referred to as: SML language) leads to the execution of a procedure which is known as a primitive-coding function.

A primitive-coding function itself, like the rest of the interpreter, is compiled by being written originally in for example C language. The input arguments are received in SML language because they come from a calling device which functions in SML language. Likewise, the value that is returned to the calling device is always in SML language.

With regard to the base functions BF (in SML language), once the primitive-coding function has accomplished its task, a return is made to the calling device. However, in the case where an SML function call represents a request for access to one of the services offered by the set LIB, then the primitive-coding function must carry out a supplementary operation which generally leads to the execution of the following tasks:

validation of the input arguments (in SML language),
if there is no error, conversion of the arguments in SML language into arguments in C-type language,
calling of a procedure in one of the external libraries of the set LIB furnishing input arguments in C-type language,
after the return of the external procedure, a return to the calling device furnishing a return value in SML language.

Remarkably, the SML language permits the implementation of a very large number of applications in the field of distributed data processing, also known as cooperative data processing. This language exhibits the characteristics of LISP-type languages and it is intended to furnish efficient and coherent means for access to, manipulation of, and presentation of management information in networks and information systems. In order to do this, it must observe the following principal rules:

The managed objects are defined by standard ISO rules.
The operations performed on the managed objects are coherent and conform to those described in the ISO standard for using the services of networks and information management systems (see ISO CMIS).
Access to data bases is possible by means of a structured language such as SQL.

The user interface, for example for dialogue or for the displaying of information, is managed by means of the functions which allow access to the components for the development and management of graphic user interfaces like for example X/Motif on one hand, and to the applications that use elaborate graphic objects such as the GO (Graphic Objects) system on the other hand.

The SML language used according to the invention is influenced by the "Common LISP" language, but does not necessarily seek to be totally compatible with it, because the SML language seeks to achieve objectives that are fundamentally different from those of "Common LISP" or any other LISP dialect. In fact, on the whole the LISP dialects are used largely in the artificial intelligence field, while the SML language is adapted to distributed data processing applications and to the integration of management services. For this reason, there are substantially fewer necessary base functions in SML language than there are functions proposed in "Common LISP" for example.

There are other differences between the SML language and "Common LISP." Thus in the SML language, an atom can have only one value, whereas the standard LISP dialects, for example, allow the same name to be given to a variable and to a function without there being any risk of conflict. Likewise, in the SML language, lists are manipulated internally like tables so as to accelerate the polling operations for the analysis and scanning of information.

It is also important to point out that the managed objects in a management information base (a base which contains all of the information that is useful for a given application) which have a tree structure are easily represented in the form of lists, a representation that is naturally obtained by the SML language.

The external libraries in the set LIB are constituted by compiled procedures originally written in C-type language, but in contrast with the primitive-coding functions, they do not recognize arguments or objects of the SML type. These procedures perform a conversion of the SML-type arguments into C-type language or they perform the reverse conversion, and thus may be considered as procedures which link the external libraries of the set LIB to the SML functions.

The use of functions such as XAF or MIF is compulsory, to permit a user to have access to every application on one hand, and to permit the retrieval of a piece of information contained in a management service of the networks and information systems, (data bases for example), on the other hand. The use of the functions GOF, while useful, is not compulsory, and the use of the functions SAF is never compulsory for an application. In fact, the functions SAF are only used to permit creation of and/or access to the relational data bases. The connection with such a data base may be set up for a use that is specific to one application; likewise this data base may be shared by several applications.

The interface API authorizes the application of every function SAF, XAF, GOF, and MIF by means of a function BF in SML language which results in the execution of an SML primitive-coding function. After several basic verification and formatting operations, the SML primitive-coding function calls the appropriate function permitting access to one of the external libraries in the set LIB.

In addition, the role of the nucleus K consists of creating the link between an SML function call and an SML primitive-coding function. The SML primitive-coding functions and the functions SAF, XAF, GAF, and MIF are procedures in C-type language, with code compilation. The original SML function call itself is interpreted. Generally, the interpretation phase corresponds to less than one percent of the execution time, and the longest part of the processing time is spent in the execution of compiled codes.

An important and advantageous characteristic of the SML environment is due to its reactivity to exterior events. Thus, an SML application can, by means of an interface, access various services and request to be notified of every event that occurs. For example, the action of a user (on a keyboard, a screen, a mouse, etc.) may be considered to be a specific event which "wakes up" an SML application, making it possible to start a dialogue with the user. This "wake-up" operation involves the execution of specific SML procedures in order to process the event. Such procedures, known as recall or "callback" procedures are of extreme importance to the development of every SML application.

An SML application is implemented for the processing of events after calls to the appropriate event source have been produced and after the name of the recall procedure which must be initiated whenever an event occurs has been furnished.

An SML application may in fact be considered as a collection of recall procedures. At the start-up of the application after initialization, it notifies the event sources of its requirements and furnishes the names of the appropriate recall procedures. Then the application waits for the occurrence of these events.

The events which occur are managed by the nucleus K of the SML interpreter. Thus, the nucleus is not only responsible for the connections between the SML calls and the SML primitive-coding functions, but also for processing events. When an event originating from a given source occurs, the nucleus waits, if need be, for the application's idle period, then activates the appropriate return procedure.

If another event occurs while the application is engaged in processing an event, the nucleus waits for the completion of the task in progress before activating the return procedure corresponding to the new event. Thus, events may remain in a processing queue for a given application, the first in line being the next to be processed. There is no notion of priority in the processing of events.

According to the programming concepts which relate to the present invention, an ordinary SML application, which must be developed, must principally accomplish the following two essential tasks:

to create an interface with the user, which involves displaying objects on the screen (windows, dialogue boxes, buttons, etc.) for controlling the dialogue between the user and the application, to retrieve, manipulate and display the information requested by the user.

The SML language furnishes the interface with the various functions which authorize the execution of these two essential tasks.

The user interface is usually coded to use systems for the development and management of graphic user interfaces like, for example, the known system OSF/Motif-X/Windows (trademarks registered respectively by the Open Software Foundation and by M.I.T.). The SML language furnishes the interface for the compiled functions XAF which access the external library XML, for example X/Motif.

Once the application has determined the information that is required by the user, it must retrieve this information in the following step.

The set of information which must be made available to the various applications is called the managed information base MIB. This base does not consist of a simple data directory, like a centralized data base, but is conceptual in nature because it represents the pieces of information which can be supplied when necessary.

To retrieve a piece of information in the MIB base does not then involve a request for access to a data base. It involves requesting of a piece of information from a component which can supply the required information. Each of its components manages a part of the MIB base.

The interaction between an application (requesting component) and an information manager (information supplying component) is obtained by means of messages sent between the two components. A manager responds to requests for information by supplying the application by means of parts of objects that it knows, the manager of these objects hereinafter being called an object manager.

The environment in which the invention is applied uses, from a semantic point of view, an "object-oriented" paradigm, which means that a programmer will not use a "procedure-oriented" approach. An object differs from a procedure in that it is an entity from which a certain number of actions can be required. The data belonging to an object are never directly manipulated by anything other than the object itself; there is no concept of global data, as is generally the case for the "procedure-oriented" model.

To develop an application in the present context, using an "object-oriented" model, it is necessary to bear in mind that an entity which sends a message to an object does not have to wait for the processing of the message by the object to end, but can, due to its asynchronous operation, send other messages to other objects while waiting for the response to the message sent to the first object. On the contrary, because its operation is synchronous, once a procedure is called the calling code blocks all other calls as long as this procedure has not been completed.

In the implementation of these various applications, the messages can designate and be directly applied to an object since the object itself does not process the messages sent by an application; it is the object manager that carries out the processing.

It is possible to correspond this model of applications and object managers with the client-server model in which the applications are the clients and the object managers are the servers. This implies only that the applications require the services of object managers. When an object manager receives a message emitted by an application, it interprets and processes the message.

If an integrator agent is considered to be an object manager which supplies information to an application emitting a request, this integrator agent will have to communicate via an interface with an agent (generally a component of another system) which manages the attribute values of a managed object from a management information base.

One important characteristic of an application is that it interacts directly with the user, which an object manager does not do. An application receives requests by means of a user interface and sends the information back to the user; on the other hand an application does not manage objects, nor does it act on behalf of other applications or other object managers.

As seen previously, an application reacts to events, which means that it effectively waits until an event, for example the interaction of a user, occurs. However, the application does not itself generate events, which are only generated by object managers.

When an application is used in an SML environment, it must be prepared to respond to the interactions of a user. Information requests from a user cause interactions between the application and one or more object managers. This implies then, the active presence of a manager or managers on one hand, and that this or these managers are ready to receive the messages emitted by the applications on the other hand. For this reason, the managers are always ready to operate, and they must remain actively present as long as the applications are active.

In this context, all the applications and the object managers communicate with one another by means of communication infrastructures using standard protocols and services.

This infrastructure includes the communications management services which in turn include the management services of the networks and information systems.

Applications, just like object managers, have access to the management services of networks and information systems (based on the ISO CMIS standard). An application has access to these services (CMIS for example) through the interface API by means of the functions BF and MIF and the external library MIL which in turn serves as an interface to services such as CMIS.

Two important services can be provided to the applications in question by management services of networks and information systems such as CMIS:

- to furnish a routing or switching service between the applications and the object managers for determining which manager must receive a message emitted by an application according to the type of object that the application specifies (the application not knowing whether the object manager resides in the same system or in a different system).
- to offer the applications functions which authorize the execution of operations on the managed objects from a base of managed objects, the most interesting operations being the following:
    GET: retrieves information from an object (the values of its attributes); this is the most frequently used operation.
    CANCEL GET: allows an application to notify the management services of networks and information systems that the number of responses already received after a GET operation is sufficient, so that consequently any other response from an object manager must be rejected.
    SET: gives specified values to the attributes of the objects.
    CREATE: creates an object instance.
    DELETE: deletes an object instance.

An application can only set the attribute values if the definition of the object authorizes this operation. This is also true for the CREATE and DELETE operations.

An example (non-limiting) of a set of functions BF in SML language is described below in regard to certain conventions on one hand and in regard to its syntactical description on the other hand.

By convention:

A letter symbol indicates that the symbol itself is a piece of data rather than a reference.

An asterisk * indicates that the symbol which precedes it is optional and that it can be repeated as many times as desired.

A + sign indicates that the symbol which precedes it can be repeated as many times as desired but that it must be present at least once.

Braces { } indicate that the group of symbols between the brackets is considered to be a single term.

Brackets [ ] indicate that the group of symbols between parentheses is optional.

A separation bar | indicates that several alternatives exist.

Every comment begins with a semicolon and ends at the end of the line.

Numbers are represented by 32 bits with a sign and can be noted in decimal form (by default), in hexadecimal form (#x or 0x) or according to their ASCII code (#/J).

The symbols are identifiers which allow functions or variables to be named.

A symbol beginning with a colon (:) is a key word. Key words are used in the definition of the functions.

The symbols in the SML language are monoevaluated, and consequently a symbol can refer to a function or to a variable but not to both.

As in every LISP dialect, a list is at the same time a data structure and a program structure. By default, a list is evaluated and the first element must be a function. An evaluation can nevertheless be avoided by using the function (').

Lists are expandable sets of consecutive elements stored in a memory, and consequently do not have the conventional chained cell LISP structure. Lists or strings of lists (sets of lists), however, are processed like Common LISP sequences.

A "Property" list is a special list composed in pairs, each pair containing an attribute and its associated value; the attribute must be a symbol.

Strings of lists are framed by quotation marks.

The following is a listing of the principal control functions.

"Catch" and "throw": these functions, manipulated in a relatively exceptional way, provide an effective mechanism for exiting from a complex processing. The "catch" function evaluates a form, but, if a "throw" with the same label occurs during the evaluation of the "form," this evaluation is not completed and "catch" returns the evaluation "result".

The label must be defined as a target for the control transfer. "Catch" and "throw" are paired. Several "catch-throw" combinations can be used with various labels. It is compulsory for a "throw" to correspond to a "catch"; if a "throw" is found with an unknown label an error is signaled.

"Cond": this is a conditional test. This function evaluates the "form" associated with the first test that returns a verified condition. The function returns the evaluation of the condition of its forms. When each test produces a "nil" (nothing is found), the "cond" function returns a "nil."

"do": this function operates a general iteration; it provides a generalized mechanism for iteration with an arbitrary number index. At first the variables are linked to their initial value, and then the function executes a loop which functions in this way:

evaluation of the final test. If this attribute is verified and "results" is specified, there is an evaluation of "results" and a return of the last evaluation. If "results" is not specified, "nil" is returned.

evaluation of each "form."

evaluation of the "by step" expressions from left to right; each result is linked to the corresponding variable subscript. If "step" is omitted, the variable remains unchanged.

"dolist": this function operates an iteration in the elements of a list, successively assigns each element of the list to a "variable," and evaluates each "form." If "result" is omitted, "nil" is returned.

"dotimes": this function makes it possible to create a loop from zero to (n−1), operating in the following manner. First it evaluates the number of cycles to be executed, which must be a whole number. Then it successively assigns the whole numbers from zero to (the evaluated number−1). The instructions from each form are executed for each iteration. If the evaluated number is equal to 0 or has a negative value, the instructions are not executed. The result of this function is the evaluation "result," or if "result" is omitted the result is "nil."

"eval": this function evaluates an SML expression in the instantaneous environment. A double evaluation is produced if the argument is evaluated by SML before being evaluated by this function.

"exit": this function closes the SML environment by terminating the execution.

"for" and "mapfor": these functions proceed to an iteration in a list of values. They successively assign a "variable" (not evaluated) to each of the elements of the list of evaluated values and execute the instructions. "For" returns the value of the last instruction evaluation of the last iteration, while "mapfor" makes a list composed of the successive "instruction" values for the iterations.

"if": a conditional test whose function is similar to "cond," but with a level of parenthesis suppressed. It executes the "then" part of the first verified condition or the "else" part (if it exists) if no previous condition has been verified.

"let": this function announces a local variable and operates as follows:

evaluation of all the initial values and linking of these values to the corresponding variables.

sequential evaluation of each "form."

If no initial value is associated with a variable, "nil" is initialized. The return value of the function is that which is returned by the last "form."

"progn": this function executes the instructions in sequence, evaluates each "form," and returns the result of the last evaluation. It is useful when more than one instruction is expected, for example in the "then" parts of an "if" instruction.

"quote" or "/": the object of this function is to bypass an evaluation. It returns the object without evaluating it.

"set" or "setq": this function is used to assign a value to a variable. It is the equivalent of the assignment function in LISP dialects. In its "Setq" form, the first argument is not evaluated, although it is evaluated in its "set" form. Both functions evaluate the second argument and set the value of the first argument at the resultant value. Setting the active values does not modify their value but rather calls a predefined function on the value.

"some" and "every": these two functions cause an iteration for searching for an attribute in a list. For this purpose, they apply an attribute function to each element of a list. "Some" applies the function until a value other than "nil" is returned, and then returns this value; otherwise it eventually returns "nil." "Every" applies the function until a "nil" value is returned, and returns "nil"; otherwise it eventually returns the last result obtained. The number of lists given should be equal to the number of arguments of the applied function. Thus the function is applied n times when n is the length of the first list provided.

If one of the other lists is smaller than the first list, it will be considered as a list with the same size as the first one, a size which is finally obtained by adding on its last element as many times as necessary. If the first list is smaller than another list, only the first n elements of the other lists are referenced.

"unless": this function, which is a negative conditional test, executes each instruction and returns the value of the last one if the condition is evaluated at the value "nil"; otherwise "nil" is returned. It is the opposite of the "when" function described below.

"unwind-protect": this function returns the evaluation of the "protected form," but it guarantees an exit attempt by an internal throw; each "form" will be evaluated in sequence before obeying "throw."

"when": this function, a positive conditional test, executes each instruction and returns the value of the last instruction if the evaluated condition is verified; otherwise "nil" is returned.

"while": this function executes each instruction in sequence until a "nil" condition is reached. The function always returns "nil."

"with" or "with-eval": these functions announce a local variable. They are constructions that are used to announce and initialize variables which belong to a group of instructions. Active values and functions are manipulated as desired, and their initial value resets to zero after the execution of "with." Values are evaluated sequentially. The argument "context" is a list of variables and associated values (a property list) which can be reused in several "with" functions. The "with-eval" function evaluates the expression and then uses it as a context. Taking into account the structure of the SML interpreter, "with" operates in the same way with active values and functions.

The following is a listing of the principal input/output functions.

"close": makes it possible to terminate the processing of an object in a flow. This instruction is the opposite of the "open" instruction described below.

"load": this function makes it possible to load and execute an SML file specified by "filename" by using a search path specified by a variable. A first attempt is made to find a file designated "filename sml" in each directory of the specified path. Then if the file is not found, a search is made for a file designated "filename." If the file name includes a "/" character, this name is considered to be an absolute path name and the search path is not used. If any error occurs during the reading of the file, an error message is transmitted and any further reading of the file is stopped. If the file is found, the function returns the file name as a string. If the file is not found and the key word "if-does-not-exist" is specified, either an error is indicated, or the "nil" function is returned. If the file is not found and the key word "if-does-not-exist" is not specified, an error is indicated.

"open": makes it possible to open the processing of an object in a flow. This function creates a flow of objects by opening the "filename" file, and it returns an object of the "flux" type. The key words and their corresponding values determine the type of flux to create; the choice of input, output or both is specified by the key word ":direction," and the direction is one of the following:
:input: input flow (by default)
output: output flow
:io: bidirectional flow The key word: ":if-exists" specifies the action to take if the file exists and is open; in ":output" or ":io", the key value is one of the following:
:append: the start position is the end of the file (by default)
:overwrite: the starting position is the beginning of the file; current file contents, if any, are not overwritten.
:supersede: the start position is the beginning of the file; the contents of the current file, if there are any, are replaced.

The key word ":type" specifies the type of file; the key value is one of the following:
:file: the flow created is a UNIX file (by default)
:string: the flow created is an internal string. The input/output functions like "read" or "print" (described below) can be applied in the same way as the string manipulation commands.

The key word ":buffered" specifies whether or not the buffer register must be cleared at each output operation; the key value is one of the following:
nil: it need not be cleared
t: it must be cleared (by default), "prinl": this function prints the SML objects; each object is specified in its natural form, which means without spacing and without any division between lines. The function returns the last object evaluated. The output is "cleared" at the end of the call, according to the value of the key word ":buffered" in the "open" function.

"print": this function allows the printing of a new line, and then of each SML object, each object being printed without spacing or division between lines. The function returns the last object evaluated. The output is also "cleared" at the end of the call according to the value of the key word "buffered" in the "open" function.

*print-readably*: makes it possible to control the representation of the printing. The "*print-readably*" function is a variable. If the value is "nil" (by default), any output can be read, which means that the special characters are interpreted in order to improve readability. If the value is "true,"0 any output is printed as though it contained special characters, except for the escape sequences which are always interpreted without taking the value of "*print-readably*" into account.

"*print-level*": makes it possible to control the printing of the depth of the lists. This function is a variable which controls the maximum depth of the lists to be printed.

"provide" and "require": these functions manage the loading of a file. They help to determine if an SML file has been loaded so as to avoid loading it a second time. The common argument "file" must be a symbol which defines the file using its printing name. The "file", symbol is then set at the value "nil" by one function or another. The "require" function searches to see if the file is present and therefore loaded in SML. If the file is not present then it is either loaded, or else nothing is done. The confirmation that a file has already been loaded is given by the "provide" function. The "provide" function confirms that the file has been loaded. This function is generally called in the loaded file.

"read": allows the reading and interpretation of a string. This function reads the next expression in the input flow if it is specified, or in the "standard input" if it is not specified, analyzes it and returns it. At the end of the file the function executes a "throw" to the "end of file" label.

"read-char": this function reads a character in the input flow if it is specified, or in the "standard input" if it is not, and returns it. This function is useful for binary files in which the bytes can be read in this way.

"read-line": this function reads a string of characters in the input flow if it is specified, or in the "standard input" if it is not, and it returns it without taking into account the new line at the end. At the end of the file, it executes a "throw" to the "end of file" label.

"*standard-error*" or "*standard-input*" or "*standard-output*": functions used for standard flows. They correspond to global variables; otherwise they are set by default at associated values. If a variable is set at the value "nil," it is reset at its value by default.

"write-char": this function writes a character in the output flow if it is specified, or in the "standard output" if it is not, and returns it. This function is useful for creating binary files in which the bytes can be written in this way.

"write-line": this function writes a string of characters in the output flow if it is specified, or in the "standard-output" if it is not, and returns it.

The following are the definitions of the principal symbols.

"defconstant": this function announces and sets a variable at a given value which cannot be referenced in a "setq" or "let" function.

"defvar": this function announces that the specified variable is a global variable. Global variables can be read dynamically by "let" constructions.

"documentation": sets or retrieves a documentation. If "string" is not specified, this function retrieves the documentation for the symbol that is specified. If the documentation does not exist, the value "nil" is returned. If "string" is specified, it is associated with a "symbol," and an error appears if the symbol is not defined. The "documentation" can be defined by the "defvar," "defconstant," "defun" and "defmacro" functions.

"gensym": this function generates and returns a new symbol. Its name is composed of the letter G followed by a number that is incremented with each function call.

"intern": this function creates and returns a symbol (of a string) whose name is "string."

If a symbol with the same name is found, it is returned. This function is useful for creating "atoms" with designed-in special characters like "/" or blanks (spaces).

"makunbound": this function produces a symbol which is undefined so that if the "boundp" function (described below) is applied to it, the value "nil" is returned.

The following are the definitions of the principal attributes:

"/=": this is an inequality test of the objects, which returns the value "true" if an object 1 is different from an object 2, and which otherwise returns the value "nil."

"<": this is the strict inferiority test which compares two numbers or two strings and returns the value "t" if the first argument is less than or equal to a second argument, otherwise the value "nil" is returned. The strings are compared alphabetically.

"<=": an inferiority test which compares two numbers or two strings and returns the value "t" if the first argument is less than or equal to the second one, otherwise the value "nil" is returned. The strings are also compared alphabetically.

">": a strict superiority test which compares two numbers or two strings and returns the value "t" if the first argument is greater than and not equal to the second one, otherwise the value "nil" is returned; the strings are compared alphabetically.

">=": a superiority test which compares two numbers or two strings and returns the value "t" if the first argument is greater than or equal to the second one, otherwise the value "nil" is returned; the strings are compared alphabetically.

"and": this is a "logical AND" between expressions, which evaluates each "form" from left to right. If a form is evaluated at the value "nil," the function returns this value "nil"; otherwise the value "t" is returned. If no argument is specified the function returns the value "t."

"boundp": this function tests whether or not an atom has already been defined. It returns the evaluated symbol if it has been defined, otherwise the value "nil" is returned. This function is verified if the variable called "symbol" has a value.

"compare": this function calls for the comparison between two numbers or two strings and returns one of the following values:
  a strictly positive number if the first argument is greater than the second.
  zero if the first and second arguments are equal.
  a strictly negative number if the first argument is less than the second.

"eq": a strict equality test between two objects which is verified only if the two objects are located in the same space in the memory.

"equal" or "=": an equality test between two objects which returns the value of object 1 if it is the same as that of object 2, otherwise the value "nil" is returned. The equality of the lists is verified by testing the equality of each of these elements.

"( )" or "nil": this is the "nil" value of the standard LISP language in which an object is "true" if it is not "nil."

"not": this is a "logical NOT." The value "t" is returned if the object has the value "nil," otherwise it is the value "nil" which is returned.

"or": this is an "logical OR" between expressions. It evaluates each form from left to right. If a form is evaluated at a "non nil" value, this evaluation is returned. If all the forms are evaluated at the value "nil," the last evaluation is returned.

"t": this is the true logic value.

"typep": this is the "data type" attribute. This function returns "type" if the object is this type of object, otherwise the value "nil" is returned.

The following are the definitions of the list functions:

"append": this function makes it possible to construct and return a new list or a new string by concatenation of the arguments.

"copy": this function copies an SML object, and it returns a copy of the object which must be a list.

"length": this function returns the number of elements in a list or the number of characters in a string.

"list": this function constructs and returns a list of evaluated arguments.

"list-get" or "list-put" or "list-put!": these functions make it possible to obtain or to set a value in a list. "list-get" returns a value in a list. "list-put!" changes the list and returns it, whereas "list-put" returns a new updated list. The value may be specified by a number (position) or an attribute (symbol). If an attribute is used the list is considered to be a property list and the element of the list referred to is that which is just after the symbol in the list. If a position is used, it refers to the position of the element of the list beginning with zero. If the "position" is greater than that of the last member of the list:

"list-get" returns the default value if it is specified, or the value "nil" if it is not.

"list-put" and "list-put!" insert the new member of the list in the correct position by replacing the positions that are not specified with "nil" values if necessary. If an "attribute" does not correspond to an existing attribute, "list-get" returns the value by default if it is specified, or the value "nil" if it is not.

"list-remove" or "list-remove!": these functions make it possible to withdraw one or more elements of a list. "list-remove!" changes the list and returns it, whereas "list-remove" returns a new updated list. When an "attribute" is used, the list is considered to be a property list. In this case, the attribute element and the one which follows it in the list are withdrawn. If the "position" is used, it refers to the position of the element of the list beginning with zero. If the "attribute" does not pair itself up with an existing attribute, or if the "position" is greater than that of the last member of the list, the list is unchanged.

"make-list": this function constructs and returns a list containing the size of the elements, in which each element is initialized by "form" if this attribute is present, or by "nil" if it is not present.

"map": this function applies a function to the elements of the specified list or lists, and returns a list or a string depending on the "type of result" value which determines what is constructed. The applied function must accept as many arguments as the number N of list arguments provided. The N lists must have the same length L. The "map" function returns a list or a string of L length whose elements are the result of the call of the function with the L elements of the list, if one list is specified, or if the first elements of each of several lists are specified, then the second elements of each list are returned until L elements are obtained.

"maphash": this function applies a "function" with two arguments, namely each key and its corresponding value in the property list. It always returns the value "nil." It may also be used with a table.

"nconc": this function executes the concatenation of a list 1 with each list. It physically modifies a sequence of a list or of a string and returns the list 1.

"position": in the first form the list is analyzed with the "equal" attribute. If an "item" element is present the function returns its subscript in the list beginning with zero, otherwise it returns the value "nil." In the second form the string is searched for the appearance of a "substring" element. If this element is present, the function returns the position of the character at which it begins; otherwise the value "nil" is returned.

"reverse": this function returns a new list with the same elements but in reverse order.

"sort": this function sorts the list in ascending order by means of the "comparison" function.

The function known as "comparison" is called with two elements to compare and must return a whole number. Its value will be negative, null, or positive depending on whether the first argument is smaller than, equal to, or larger than the second one.

"subseq": this function returns a sub-list from the element at the "start" position to the element at the "end" position. "Start" and "end" are numbers beginning with zero. If the number of indexed elements is greater than the table of the list, the sub-list that is returned is set at the value "nil." This function can also be used with a string.

The following are the definitions of the functions of strings and of tables:

In the same way that a string is processed like a list of characters, the list functions can also be used for strings, such as "append," "length," "map," "max," "nconc," "position," and "subseq."

"match": this function makes it possible to pair and to extract sub-strings from an SML string.

"string-downcase" or "string-upcase": these functions return a copy of a string after conversion.

Likewise, a certain number of list functions can be used to process the tables, such as "list-get," "list-put," "list-put!," "list-remove!," and "maphash." An object of a table is created by using the "coerce" function applied to a property list.

The following are the definitions of the macro definitions:

"backquote" or "'": this function creates a copy of a specified list using the list as a template for the creation of the copy.

"defun": makes it possible to define an SML function. It is the usual way to create a new function and to define the name of the function using the parameters declared in the "lambda" list and in the "form."

"defmacro": this function defines an SML macro. It is the normal way to define a new macro defining the name of the macro by using the parameters declared in the "lambda" list and in the "form."

"lambda": this function defines a "lambda" expression which is the basic form for determining an unnamed function by using "lambda" expressions. A "lambda" expression is composed of a lambda symbol, a lambda list and the body of the lambda expression. A lambda list specifies the parameters. When a function is called, its arguments are paired with the parameters of the corresponding lambda list. If the required parameters are specified, the corresponding arguments must be present when the lambda expression is applied. A "lambda" list can use key words, beginning with the & symbol and defined as follows:

& optional: optional parameters; if the arguments are not used, they are linked to the initial value if it exists, or to the value "nil" if it does exist.

& rest: rest parameters; when all the required and optional parameters are linked, then every subsequent argument is created in a list and is linked to the rest parameters.

& key: key word parameters; these are arguments constituted by pairs which include the called key word and its value.

& aux: these are local variables which are not truly parameters; this is the equivalent of the "let" function.

"lambdamacro": this function defines a lambda macro expression which is the basic form for defining an unnamed macro. If the required parameters are specified the corresponding arguments must be present when the lambda expression is applied. A "lambdamacro" list can use key words which begin with the & symbol and which are defined in a manner equivalent to those in the "lambda" list: & optional, & rest, & key and & aux.

The following is the definition of several numeric operators and other operators:

"+": a number addition operator; it can also be used as a concatenation operator for lists or strings. The type of result is determined from the type of the first argument: ( ) for a list, "" for a string, and 0 for a number.

"*" and "/": arithmetical operators which respectively return the modulo, product and quotient of the arguments.

"-": arithmetical difference operator.

"logand," "logor," "lognot," "logxor": operators which respectively correspond to the operations of logical AND, OR, NOT and EXCLUSIVE-OR.

"max" and "min": operators which respectively return the maximum or minimum value of a list of numbers or strings.

"random": an operator which generates a random number.

"coerce": its function is to specify a type and to convert the type of an object into that specified by the "result type."

"type-of": its function is to return the internal SML type of the object.

"!" or "!!": execute an interpreter command; "!" executes the command given in the form of a string with its given arguments and does not wait for the end of the operation, whereas "!!" returns an input/output flow related to the input and output commands. This command is cancelled if the flow is interrupted.

"*application-class*": this is a string constant which indicates the kind of application in progress; for an SML application the value is "SML."

"*application-name*": this is a string constant which indicates the name of the application in progress.

"command-line-args": this function returns a list of strings which represents the arguments transmitted by the interpreter to SML during the start-up.

"get-internal-run-time": this function makes it possible to return the value of the execution time in milliseconds; if no argument is furnished the returned value corresponds to the time elapsed; otherwise the value depends on one of the key words:

:real: the time elapsed since the start-up of the SML application (by default)

:user: the CPU time used during the execution of SML instructions

:system: the CPU time used by the system for the SML count.

"getenv": if the name of the variable of the chain is the name of an output variable of the interpreter, this function returns this value as a string; otherwise the function returns the value "nil."

"setenv": this function sets the name of a variable of the interpreter at a value; these two arguments must be strings.

Furthermore, it is possible with SML to defer the evaluation of expressions. The evaluation will then occur after a specified time when every request will have received its response. The internal representation of time for the SML functions is the millisecond.

"eval-after": the evaluation of expressions will be performed after a certain length of time; this function is effected in two phases:

when "eval-after" is called, each form to be evaluated later is saved with its context.

after the specified length of time, the context is linked and each form is evaluated.

This function returns an object of the "timer" type which can be reset to zero by the "remove-timer" function described below.

"eval-every": this function is similar to the preceding but it performs repetitive evaluations; it can also be reset to zero by the "remove-timer" function.

"remove-timer": this function removes an object of the "timer" type constructed by either the "eval-after" or the "eval-every" function.

SML also uses debugging aids, particularly the following functions:

"hashinfo": this function furnishes statistics on the storage of atoms. The pieces of information returned are the number of symbols, the number of insertions in the table, and the number of collisions.

"meminfo": this function furnishes and prints the state of the memory allocator used by SML.

"oblist": this function returns and prints the names of the SML atoms already defined. If the "string" symbol is not specified, all the defined names are returned; otherwise, only the names containing the "string" symbol are returned.

"stack-print-level": this function furnishes the number of structures in a stack that have been printed in error.

"trace-untrace": the "trace" function returns the list of the functions executed up until its request. The "untrace" function returns the list of the functions that up until its request have not been executed, if any exist; if none exist, it returns the value "nil."

As said previously in relation to the set of functions MIF, these functions allow access to the external library MIL which in turn serves as an interface with the management services of networks and information systems within the context of the exchange of information between an application and an object manager. Taking into account the programming concepts which relate to the management services of networks and information systems, for example CMIS, an SML application must be able to carry out the following operations:

1. initialization of services,
2. waiting for an action by a user,
3. emission of a request for the management services of networks and information systems,
4. establishment of a recall procedure for this request,
5. execution of the recall procedure when the confirmation of the request arrives,
6. a repetition beginning with step 2 until the user's final request,
7. end of the application.

As for the set of functions XAF, it allows access to the library XML which has at its disposal components for developing and managing graphic user interfaces, for example X/Motif.

The architecture of an X Window-type system is based on the client-server model.

The server manages all the input and output devices (for example, the mouse), it creates and manipulates the windows on the screen, and it produces text and graphics. The application which uses the facilities offered by the server is called a client. The client communicates with the server after connection to the network by means of specific protocols. The server communicates with the clients by sending "events" to the client applications, as when, to use a commonplace example, the server generates an event in response to an action by a user on the mouse. In the present context, this indicates that an event of this type is acted on by the SML interpreter and that a recall function specific to it is executed.

An SML application using the management services of networks and information systems such as CMIS must, while the external libraries allow the development and management of graphic user interfaces such as X/Motif, carry out the following operations:

1. initialization of the two types of services,
2. creation and representation of user interface components known as "widgets,"
3. establishment of recall procedures for user interactions
4. waiting for an action by a user,
5. emission of a request, by means of a recall procedure, for the management services of networks and information systems,
6. establishment of a recall procedure for this request,
7. execution of the recall procedure when the confirmation of the request arrives,
8. a repetition beginning with step 4 until the user's final request,
9. end of the application.

The set of functions GAF in turn allows access to the library GOL which authorizes the applications using graphic objects. Such applications make it possible to present and to edit two-dimensional graphic objects from graphic libraries which can be integrated with existing user interfaces like for example X/Motif, MS-WINDOWS, Postscript, etc.

The role of the functions SAF is to authorize access to a specific library SSL of a structured language, like for example SQL, which in turn serves as an interface with relational data bases like for example INGRES (trademark registered by Ingres Co.), ORACLE (trademark registered by Oracle Corporation), etc.

The functions SAF offer two levels of functionalities. The first one makes it possible to construct, within in the SML environment, standard requests in structured language; the functions used at this level do not interact with the data base server. The functions used at the second level interact with the data base server in order to authorize, among other things, the connection to or disconnection from this server, and the updating of it when changes are desired.

Generally, the types of data in structured language have their equivalents in SML language; there is, then, a correspondence between these two languages. Likewise, the names of tables and attributes in structured language are represented by atoms in SML language (see LISP language, for example), the values naturally having their correspondence in these two languages.

Moreover, it is possible to write extensions to SML. In order to do this the new functions must be written in type-C language and then compiled and concatenated to SML libraries.

Thus a new extended SML interpreter is obtained. Generally, the development of an SML extension involves the following steps:

Development of a code in C-type language for the primitive which must be called each time a reference is made to a new SML name.

Realization of the association between the name of the new SML function and the name of the primitive in the compiled external library.

Construction of the new SML interpreter by linking all the required libraries to it.

In conclusion, the use of a language like SML with similar representation for programs and data is particularly easy and advantageous. In fact, such a language offers great versatility of use, extreme flexibility and considerable power, making it possible to send a code fragment that has a meaning of its own, for example a transaction, offering a balancing of loads between dynamically controlled processors, and authorizing a dynamic modification of the code during the execution. In accordance with this use the code is conveyed with the same facility and versatility as a simple data transfer. A programming language such as this makes it possible to considerably reduce the development time of an application.

Moreover, the language used according to the invention, in which typing affects the contents of the variables rather than the variables, makes it possible to create interfaces for access to servers that are significantly simplified and that facilitate generic programming, as the structure of the data is manipulated directly without conditions. In effect, the SML variables have no type, since they are all assumed to exist at an undetermined state (the value "nil"), and their type is set at the same moment as an assignment, thus authorizing a generic programming. This is a powerful advantage in relation to C-type languages for which types are compiled, which requires them to be known before a programming.

Another important advantage comes from the fact that the executable code can easily and naturally be modified by itself in order to adapt to the different types of data received. Thus, an application can send a request to the network in order to ask for the value of an administrative object without knowing its structure, and then dynamically construct display and update functions which are adapted to the structure of the object received. In effect, as seen previously, the fact that there would be no difference between the program and the data has the consequence that the program can modify itself and results in an application that dynamically modifies itself as a function of the data it manipulates.

Finally, a language of this type, which has an assembler characteristic and facilitates interfacing with various information servers, provides an equally important advantage of being used as a very high-level language for management applications. Thus for example it allows access to a library that is specific to a structured language such as SQL while preserving the assembler characteristic of this language.

Moreover, it makes it possible to create interfaces which preserve the tree-like characteristic of several servers, like for example for administration platforms in networks.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A method of using a language using lists which are simultaneously data structure and program structure with a similar representation for programs and data for the distribution of information and processing in a network management system comprising the steps of creating a direct symmetrical communication in accordance with executable messages which convey a code to be executed, identifying simultaneously functions to be applied and the data to which said functions must be applied, which are asynchronous messages sent through the network management system in a free format from an interpreter of said language in one machine to another interpreter of said language in another machine, and which moreover authorize a dynamic modification of the code as a function of the data manipulated during execution and a dynamic migration of different code fragments to different machines of the network management system, introducing programs written in said language in various ways into one or more machines, establishing the lines of communication and then exchanging data, programs or code fragments to create a symmetrical cooperative network of interpreters having a load which is dynamically balanced between the different machines.

2. The method of claim 1, further including using LISP as said language.

3. An interpreter (INT) of a machine which uses a language using lists which are simultaneously data structure and program structure having a similar representation for programs and data for the distribution of information and processing in a network management system characterized in that a direct symmetrical communication is created in accordance with executable messages which convey a code to be executed, identifying simultaneously functions to be applied and the data to which said functions must be applied, which are asynchronous messages sent through the network management system in a free format from an interpreter of said language in one machine to another interpreter of said language in another machine, and which moreover authorize a dynamic modification of the code as a function of the data manipulated during execution and a dynamic migration of different code fragments to different machines of the network management system, programs written in said language being introduced in various ways into one or more machines, establishing the lines of communication and then exchanging data, programs or code fragments, thus creating a symmetrical cooperative network of interpreters having a load which is dynamically balanced between the different machines, said interpreter comprising a nucleus (K) which processes the program to be executed by relying as much on the internal services as on the code which executes primitive functions (SOF) of the language, and a documented programmatic interface (API) between the nucleus and the code which executes the primitive functions for authorizing access to a plurality of services and facilitating the extension of the language and the interpreter to new primitive functions.

4. The interpreter according to claim 3, further including a set of functions which implement the primitive functions, said set of functions constituted by functions belonging to the language with similar representation for programs and data, and extended functions allowing access to a plurality of services.

5. The interpreter according to claim 4, wherein during an application requesting access to management services of networks and information systems, said interpreter performs the following operations:
   1. initialization of services,
   2. waiting for an action by a user,
   3. emission of a request for the management services of networks and information systems,
   4. establishment of a recall procedure for said request,
   5. execution of the recall procedure when the confirmation of the request arrives,
   6. a repetition beginning with step 2 until the user's final request, and
   7. end of the application.

6. An interpreter according to claim 5, wherein any new event or action event occurring before the step of execution of the recall procedure is stored in a processing queue for the given application.

7. The interpreter according to claim 4, wherein during an application requesting access to management services of networks and information systems, and to libraries furnishing components for the development and management of graphic user interfaces, said interpreter performs the following operations:

1. initialization of internal services,
2. creation and representation of user interface components known as "widgets,"
3. establishment of recall procedures for user interactions,
4. waiting for an action by a user,
5. emission of a request, by means of a recall procedure, for the management services of networks and information systems,
6. establishment of a recall procedure for said request,
7. execution of the recall procedure when the confirmation of the request arrives,
8. a repetition beginning with step 4 until the user's final request, and
9. end of the application.

8. An interpreter according to claim 7, wherein any new event or action event occurring before the step of execution of the recall procedure is stored in a processing queue for the given application.

9. An interpreter according to claim 4, wherein the extended function is constituted by at least one of the following functions:
   a function SAF allowing access to a specific library for a structured language serving as an interface with relational data base,
   a function AF allowing access to a library furnishing the components for developing and managing graphic user interface,
   a function GAF allowing access to a library authorizing the application to use elaborate graphic objects,
   a function MIF allowing access to a library serving as an interface with a management service of networks and information systems.

10. An interpreter according to claim 9 wherein the external library is constituted by compiled procedures originally written in C-type language for performing conversion of the said language arguments into C-type language and visa versa.

11. An interpreter according to claim 10 wherein the use of functions such as XAF or MIF is compulsory.

12. The interpreter according to claim 4, wherein during an application requesting access to one of the services offered by the set of libraries, the code which executes a primitive function must carry out a supplementary operation which generally leads to the execution of the following steps:
   validation of the input arguments;
   if there are no errors, conversion of the arguments in said language into arguments in C-type language;
   calling a procedure in one of the external libraries of the set of libraries furnishing input arguments in C-type language;
   after the return of the external procedure, a return to the calling device furnishes a return value in said language.

13. An interpreter according claim 3 wherein the nucleus creates the link between a function call in said language and the execution of a procedure of code which executes a primitive coding function.

14. An interpreter according to claim 13, wherein the primitive coding function is compiled in the interpreter and receives input arguments and returns a value expressed in said language.

15. An interpreter (INT) of a machine which uses a LISP language having a similar representation for programs and data for the distribution of information and processing in a network management system characterized in that a direct symmetrical communication is created in accordance with executable messages which convey a code to be executed, identifying simultaneously functions to be applied and the data to which said functions must be applied, which are asynchronous messages sent through the network management system in a free format from an interpreter of said language in one machine to another interpreter of said language in another machine, and which moreover authorize a dynamic modification of the code as a function of the data manipulated during execution and a dynamic migration of different code fragments to different machines of the network management system, programs written in said language being introduced in various ways into one or more machines, establishing the lines of communication and then exchanging data, programs or fragments of programs, thus creating a symmetrical cooperative network of interpreters having a load which is dynamically balanced between the different machines, said interpreter comprising a nucleus (K) which processes the program to be executed by relying as much on the internal services as on the code which executes primitive functions (SOF) of the language, and by a documented programmatic interface (API) between the nucleus and the code which executes the primitive functions for authorizing access to a plurality of services and facilitating the extension of the language and the interpreter to new primitive functions.

16. The interpreter according to claim 15, further including a set of functions which implement the primitive functions, said set of functions constituted by functions belonging to the language with similar representation for programs and data, and by extended functions allowing access to a plurality of services.

17. The interpreter according to claim 16, wherein during an application requesting access to management services of networks and information systems, said interpreter performs the following operations:
   1. initialization of services,
   2. waiting for an action by a user,
   3. emission of a request for the management services of networks and information systems,
   4. establishment of a recall procedure for said request,
   5. execution of the recall procedure when the confirmation of the request arrives,
   6. a repetition beginning with step 2 until the user's final request, and
   7. end of the application.

18. An interpreter according to claim 17, wherein any new event or action event occurring before the step of execution of the recall procedure is stored in a processing queue for the given application.

19. The interpreter according to claim 16, wherein during an application requesting access to management services of networks and information systems, and to libraries furnishing components for the development and management of graphic user interfaces, said interpreter performs the following operations:
   1. initialization of internal services,
   2. creation and representation of user interface components known as "widgets,"
   3. establishment of recall procedures for user interactions,
   4. waiting for an action by a user,
   5. emission of a request, by means of a recall procedure, for the management services of networks and information systems,
   6. establishment of a recall procedure for said request,
   7. execution of the recall procedure when the confirmation of the request arrives,
   8. a repetition beginning with step 4 until the user's final request, and
   9. end of the application.

20. An interpreter according to claim 19 wherein any new event or action event occurring before the step of execution of the recall procedure is stored in a processing queue for the given application.

21. An interpreter according to claim 16, wherein the extended function is constituted by at least one of the following functions:
   a function SAF allowing access to a specific library for a structured language serving as an interface with relational data base,
   a function AF allowing access to a library furnishing the components for developing and managing graphic user interface,
   a function GAF allowing access to a library authorizing the application to use elaborate graphic objects,
   a function MIF allowing access to a library serving as an interface with a management service of networks and information systems.

22. The interpreter according to claim 16, wherein during an application requesting access to one of the services offered by the set of libraries, the code which executes a primitive function must carry out a supplementary operation which generally leads to the execution of the following steps:
   validation of the input arguments;
   if there are no errors, conversion of the arguments in said language into arguments in C-type language;
   calling a procedure in one of the external libraries of the set of libraries furnishing input arguments in C-type language;
   after the return of the external procedure, a return to the calling device furnishes a return value in said language.

* * * * *